United States Patent Office 3,492,031
Patented Jan. 27, 1970

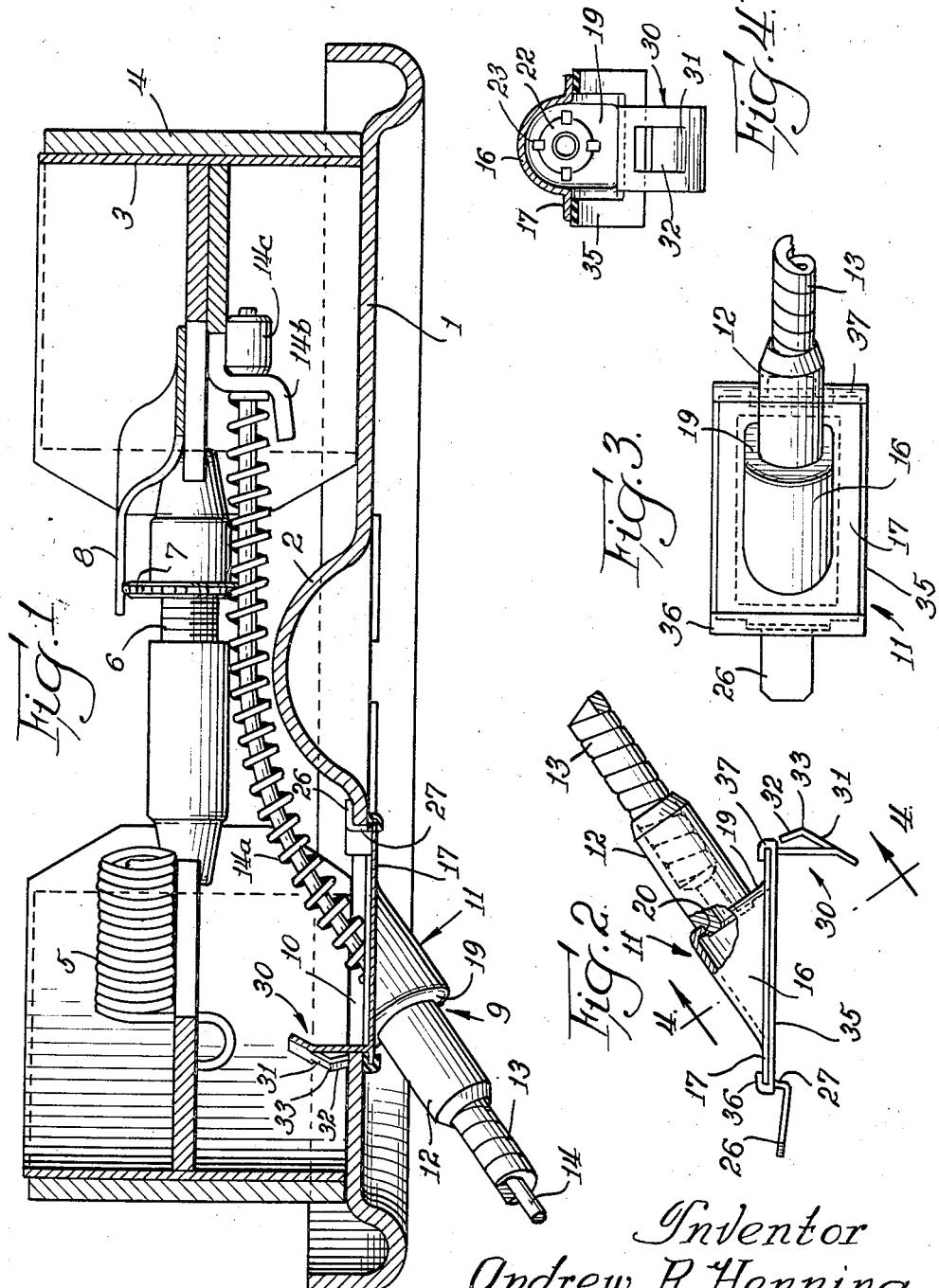

3,492,031
ANGLED SNAP-IN END FITTING FOR
FLEXIBLE CABLE ASSEMBLY
Andrew R. Henning, Richland, Mich., assignor to
Shakespeare Company, Kalamazoo, Mich., a corporation of Michigan
Filed May 12, 1966, Ser. No. 549,535
Int. Cl. F16b 9/00; B25g 3/00; B04g 7/22
U.S. Cl. 287—20
14 Claims

ABSTRACT OF THE DISCLOSURE

An integral snap-in clip comprising a housing having an apertured base for mounting on a plate, snap-in latch means adapted to be inserted into an aperture of the plate to secure the clip thereto, and a surface on the housing at an acute angle with respect to the base which is to be mounted on the plate, the surface having an aperture therein adapted to receive a cable fitting disposed at an acute angle to the plate.

The present invention relates to flexible transmission cable assemblies, and is more particularly concerned with a novel cable assembly having a snap end fitting or clip adapted for mounting the cable housing on the wall or plate of a housing such as a brake drum housing, and which fitting permits the cable assembly to be so mounted that it enters the housing at an acute angle.

In many applications utilizing flexible control cables, as for example flexible cable assemblies used in conjunction with parking brakes in automobiles, the cable must enter the housing wall or back-up plate at an acute angle thereto. In the past only snap-end fittings have been used which must be mounted at right angles to the surface of the plate or wall of the housing. Consequently, in order to permit the cable to enter the housing at an acute angle, it was necessary to shape or distort a portion of the housing wall at the aperture through which the snap fitting was to be placed so that the snap fitting could be affixed at a right angle to a small area of the housing wall while still positioned at an acute angle to the housing wall proper. Drum housings which are so constructed are more expensive to fabricate since an additional step is involved in shaping a seat for the end fittings in the back-up plate disposed at an acute angle thereto. Moreover, distortion of the housing wall may result in a weakening of the structure.

It is an object of the present invention to provide a flexible cable assembly having end fittings which are relatively inexpensive to produce. It is a further object to provide such flexible cables having end fittings which are readily secured thereto and which, one affixed, remain so affixed even when large forces are applied thereto. It is a prime object to provide a snap end fitting or clip which may be used to affix flexible cable assemblies to plates or walls of housings at an acute angle thereto, without the necessity for reshaping or distorting the housing wall. The accomplishment of the foregoing and additional objects will become more fully apparent hereinafter.

The invention in its preferred embodiment is illustrated by the accompanying drawings in which:

FIG. 1 is a cross-sectional view of an automobile brake housing showing a parking brake flexible cable assembly mounted on a wall of the housing and being disposed thereto at an acute angle.

FIG. 2 is a side elevation partly in cross-section of the snap-in end fitting of the invention.

FIG. 3 is a top plan view of the fitting; and

FIG. 4 is a cross-sectional view taken at the line 4—4 of FIG. 2.

According to the invention, an integral snap-in end fitting or clip is provided comprising an acutely angled housing terminating in a peripheral flange and adapted to be mounted on the wall or plate of a brake or similar housing. The clip is provided with an aperture adapted to engage and become affixed to a flexible cable assembly with the cable disposed at an acute angle to the flange. The flange is provided with snap-in locking means adapted to be inserted into an aperture in the plate or wall of the brake or similar housing where it may be snapped into place and the cable assembly maintained at an acute angle to the plate. Although the housing as shown is convex with respect to the plate or housing on which it is to be mounted, it will be apparent that the same result can be achieved if the housing is concave (and thus having at least a portion located inwardly of the drum or housing).

Reference is now made to the accompanying drawing for a better understanding of the invention, wherein all the parts are numbered and wherein the same numbers are used to refer to corresponding parts throughout.

Referring to FIG. 1, a cross-sectional view of a brake drum assembly is shown which is suitable for use in a motor vehicle. The assembly is conventional in most respects and comprises a brake assembly back-up plate 1 having a convex depression 2 for mounting over an axle. The brake drum assembly further comprises a brake shoe 3 having brake lining 4 affixed thereto, a return spring 5 and a brake adjustment assembly comprising a screw 6 having a knurled head 7 retained in position by a detent 8. A cable end fitting assembly 9 is mounted on the back-up plate 1 through a rectangular opening 10 provided therein and comprises a snap-in clip 11, a ferrule 12 mounted thereon, a brake cable conduit 13 having an end affixed in a cylindrical opening provided in one end of the ferrule 12, and a flexible cable 14 slideably positioned within the conduit 13. Mounted over the exposed portion of the brake cable within the drum is a helical compression spring 14a. The end of the flexible cable 14 is affixed through a fitting 14b by means of a cylindrical nut 14c.

The clip, ferrule and conduit assembly is shown in greater detail in FIGS. 2–4. The integral snap-in clip 11 shown therein comprises a convex housing 16 terminating in an outwardly extending flange 17. The housing 16 is substantially in the form of a cylindrical sector defined by its intersection at an acute angle with the flange 17. The housing 16 has a substantially planar wall 19 provided with a circular aperture 20. A ferrule 12 is affixed to the planar end wall 19 by inserting a reduced end 22 through the aperture 20 and affixing of the same in place by means of stakes 23. The flexible helical sheath or conduit 13 is positioned within a cylindrical chamber 24 of the ferrule 12 and is affixed thereto by means such as metal or plastic as by molding in place, swaging, or the like.

The means for snapping the clip in place in the rectangular opening 10 provided in the brake backing plate 1 comprises a tab or hook 26 having a small proximal depending portion 27 arranged to engage the edge of the brake backing plate and a larger distal portion extending laterally and somewhat upwardly (as shown in FIG. 2) and being so designed to provide a spring biasing force to prevent movement of the tab 26 after the assembly is mounted in a backing plate.

The rear edge of the flange 17 terminates in a depending latch member 30 which is cut to provide a centrally located resilient detent tang 31 extending rearwardly of the plane of the latch member and having its end portion 32 bent forwardly to provide a detent ridge 33. The configuration is such that the detent ridge 33 is positioned rearwardly of the rear edge of the flange 17. A resilient sheet-form sealing member 35 of a material such as rubber or neoprene is placed below the flange 17 and is provided with upturned ends 36 and 37 which are folded over and engage the ends of the plate.

The clip and cable assembly of the invention is mounted on the brake backing plate by first providing a rectangular opening 10 in the plate. The tab 26 is then inserted in the opening and engages the inner surface of the plate. As viewed in FIG. 1, the rear portion of the clip is then pushed upwardly into the opening 10, the rear edge of the rectangular opening engaging the lower portion 31 of the detent tang and forcing it forward. After the detent ridge 33 has cleared the edge of the opening 10, the resilience of the tang forces it rearwardly again and provides a spring bias force urging the detent tang end portion 32 rearwardly and upwardly against the backing plate, thereby securing the clip and assembly to the backing plate. The clip and cable assembly may be simply removed from the backing plate by forcing the detent ridge 33 to recede and to pass over the plate edge at the opening. The entire assembly may then be readily withdrawn.

The snap-in clip of the present invention and the flexible cable assembly with which it is used have several advantages over prior art devices. First, the snap-in clip is inexpensive to produce since it may be made by a simple stamping process from relatively inexpensive material such as steel. The clip may be readily attached to the ferrule of a cable assembly by any known methods such as staking, rolling or swaging. The prime advantage of the present clip is that it enables a cable which must enter a brake backing plate at an acute angle to be mounted thereon without the necessity for distorting the backing plate as is commonly done in order to provide a surface perpendicular to the cable fitting. Such a distorting step, when added to the process by which the brake backing plate is fabricated, is a rather expensive one and moreover may result in weakening of the backing plate. The present clip avoids these disadvantages by providing an angled receptacle integral with a flange which may be mounted flush with the main surface of the backing plate, thereby still permitting mounting of the cable assembly at an acute angle.

It is to be understood that the invention is not limited to the exact details of construction, operation, or exact materials or embodiments shown and described, as obvious modifications and equivalents will be apparent to one skilled in the art.

I claim:

1. An integral snap-in clip adapted for mounting a flexible cable assembly to a plate or housing with said assembly disposed at an acute angle with respect to said plate and with a flexible cable extending through an aperture provided in said plate, said snap-in clip comprising a clip housing terminating in an outwardly extending peripheral base flange, said clip housing being acutely angled with respect to said flange, means providing an aperture in said clip housing, said means receiving in said aperture a portion of said flexible cable assembly and means securing said cable assembly within said aperture, and said peripheral base flange being provided with snap-in latch means adapted to be inserted within the aperture in said plate and to engage said plate to secure said clip to said plate.

2. An integral snap-in clip according to claim 1 wherein a portion of said clip housing is provided with a substantially planar surface disposed at an acute angle with respect to said peripheral base flange, and wherein the means providing the aperture in said clip is positioned in said planar surface.

3. An integral snap-in clip according to claim 1 wherein the forward edge of said peripheral base flange is provided with a hook having a small depending proximal portion and a distal portion extending forwardly and adapted to be inserted in the aperture provided in said plate and to engage the opposite surface of said plate, and wherein the rear edge of said peripheral base flange is provided with depending spring-loaded detent means adapted to engage the rear edge of the aperture in said plate, whereby when said hook is inserted in place through the aperture in said plate and said detent means subsequently inserted in said aperture, said clip is snapped into place and retained against said plate.

4. An integral snap-in clip according to claim 3 wherein the distal portion of said hook is also directed back toward the plane of the surface of said flange, thereby providing a spring bias retaining force against the surface of said plate when said clip is inserted in the aperture of said plate.

5. An integral snap-in clip according to claim 1 additionally having a resilient sheet-form sealing member in contact engagement with the surface of said flange adapted to engage said plate.

6. A flexible cable assembly adapted to be mounted to a plate or housing at an acute angle thereto and having a portion of said cable assembly extending through an aperture provided in said plate, said assembly comprising a snap-in clip, a ferrule having an axial channel provided therein affixed to said cable assembly and at one end to said snap-in clip, and a flexible cable slideably disposed within said channel, said snap-in clip comprising a clip housing terminating in an outwardly extending peripheral base flange, said clip housing being acutely angled with respect to said flange, means providing an aperture in said clip housing, said means receiving said ferrule, means securing said ferrule to said clip housing, and said peripheral base flange being provided with snap-in latch means adapted to be inserted within the aperture in said plate and to engage said plate to secure said clip thereto.

7. A flexible cable assembly according to claim 6 wherein a portion of said housing of said clip is provided with a substantially planar surface disposed at an acute angle with respect to said peripheral base flange, and wherein the means providing the aperture in which the fixed portion of said flexible cable assembly is engaged is positioned in said planar surface.

8. A flexible cable assembly according to claim 6 wherein the forward edge of the peripheral base flange of said clip is provided with a hook having a small depending proximal portion and a distal portion extending forwardly and adapted to be inserted in the aperture provided in said plate and to engage the opposite surface of said plate, and wherein the rear edge of said peripheral base flange is provided with depending spring-loaded detent means adapted to engage the rear edge of the aperture in said plate, whereby when said hook is inserted in place through the aperture in said plate and said detent means subsequently inserted in said aperture, said clip is snapped into place and retained against said plate.

9. A flexible cable assembly according to claim 8 wherein the distal portion of said hook is also directed back toward the plane of the surface of said flange, thereby providing a spring bias retaining force against the surface of said plate when said clip is inserted into the aperture of said plate.

10. A flexible cable assembly according to claim 6 additionally having a resilient sheet-form sealing member in contact engagement with the surface of said flange adapted to engage said plate.

11. A clip according to claim 1, wherein the angled housing is adapted to be convexly or externally positioned with respect to the plate or housing upon which said angled housing is to be mounted.

12. A clip according to claim 1, wherein the angled housing is adapted to be concavely or internally positioned with respect to the plate or housing upon which said angled housing is to be mounted.

13. An assembly according to claim 6, wherein the angled housing is adapted to be convexly or externally positioned with respect to the plate or housing upon which said angled housing is to be mounted.

14. An assembly according to claim 6, wherein the angled housing is adapted to be concavely or internally positioned with respect to the plate or housing upon which said angled housing is to be mounted.

References Cited

UNITED STATES PATENTS

| | | | |
|---|---|---|---|
| 1,185,679 | 6/1916 | Jagels | 285—158 |
| 1,585,541 | 5/1926 | Drust | 285—62 |
| 2,799,518 | 7/1957 | Anderson. | |
| 2,874,980 | 2/1959 | Browning | 285—189 |
| 2,951,714 | 9/1960 | Carlberg | 285—7 |
| 3,101,205 | 8/1963 | Benham. | |
| 1,908,821 | 5/1933 | Cornell. | |
| 2,711,522 | 6/1955 | Goodwin. | |
| 2,742,624 | 4/1956 | Stevens. | |
| 2,987,330 | 6/1961 | Curran. | |
| 3,193,226 | 7/1965 | Showalter. | |

DAVID J. WILLIAMOWSKY, Primary Examiner

D. W. AROLA, Assistant Examiner

U.S. Cl. X.R.

285—158